July 28, 1936.  A. MACHOTKA  2,048,750
GRATER
Filed July 13, 1934
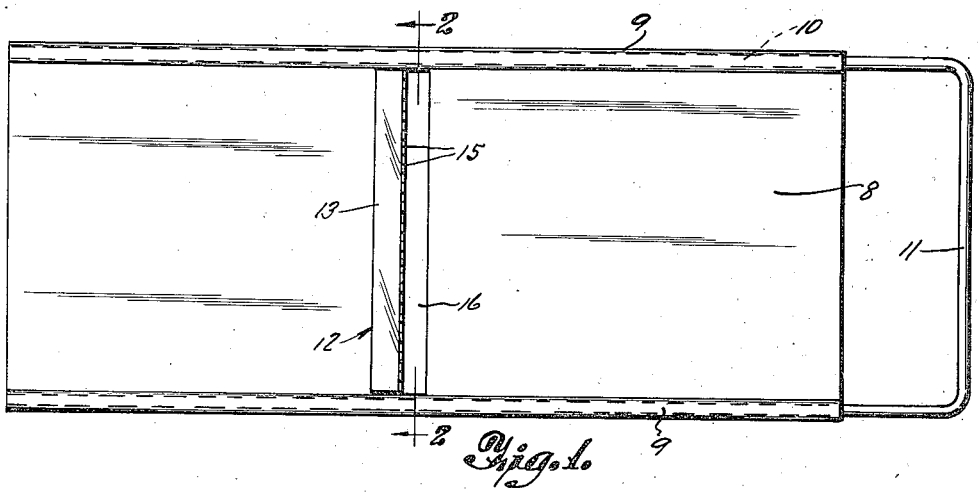
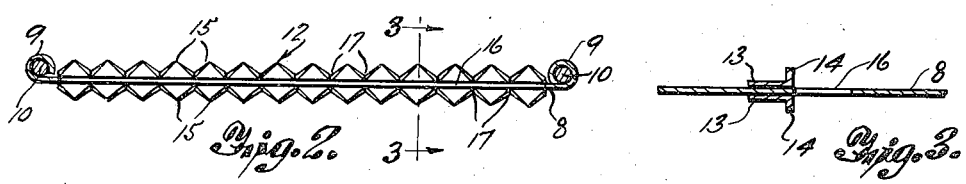 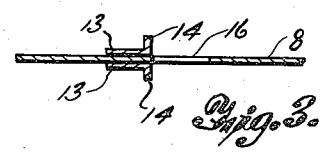
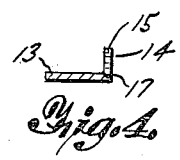 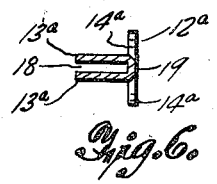
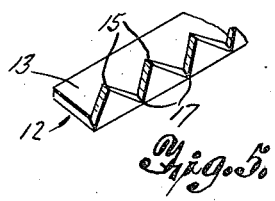 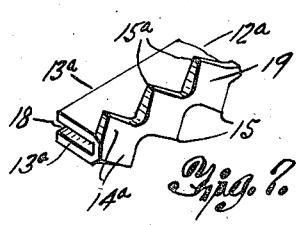
INVENTOR
ADOLF MACHOTKA
By Adam E. Fisher
ATTORNEY Patented July 28, 1936

2,048,750

UNITED STATES PATENT OFFICE 2,048,750

GRATER

Adolf Machotka, Uvalde, Tex.

Application July 13, 1934, Serial No. 734,912

1 Claim. (Cl. 146—180)

My invention relates to improvements in graters and the main object is to provide a simple, efficient and durable form of grater for grating and shredding foods such as cocoanuts, carrots and the like.

Another object is to provide an improved grating tooth structure or assembly suitable for use on all forms of graters and made up of a series of saw-like teeth or serrations formed along one or more edges of a metal bar which has flat edges suitable for securing to the body of the grater, these saw-like teeth being much stronger, more sanitary and wearing longer than the usual rough prongs punched from the grater itself.

With these and other objects in view the invention resides in the novel construction and arrangement of parts as hereinafter fully set forth and claimed, reference being had to the accompanying drawing wherein:

Figure 1 is a plan view of a flat grater provided with my improved grating teeth.

Figure 2 is an enlarged section along the line 2—2 in Figure 1.

Figure 3 is a section along the line 3—3 in Figure 2.

Figure 4 is a cross section through one of the toothed members alone.

Figure 5 is a fragmental perspective view of the member shown in Figure 4.

Figure 6 is a cross section through a modified form of toothed member.

Figure 7 is a fragmental perspective view of the member shown in Figure 6.

Referring now with more particularity to the drawing the reference character 8 designates a grater of a well known flat rectangular form made of sheet metal rolled at its edges 9 around a wire 10 which forms a handle 11. Usually this grater has a number of holes (not shown) punched in it and with jagged edges or prongs which serve as the grating elements and scrape off parts of the food passed over the grater. Such a construction of the grating elements besides being readily worn out after a short period of use is exceedingly hard to wash and clean and is very unsanitary.

In accordance with my invention I provide a toothed member 12 made up of an angle bar of suitable hard metal with a wide flat base web 13 and an upstanding narrower web 14. A series of saw-like teeth 15 are then cut along this web 14 and the bar is secured by its flat web 13 laterally across the grater 8 by spot welding or other similar fastening means. A slot 16 is cut laterally across the grater along the toothed edge of the member 12. Now as the vegetable is moved over the grater the teeth 15 will grate or shred the food and it will drop through the slot 16 into a pan or vessel (not shown) below. Since the food thus falls clear of the grater, cleaning is much easier and the straight row of teeth likewise may be readily cleaned. A separate grating element is shown on each side of the grater alongside the slot 16 and the teeth 15 in these members may well be of different sizes or shapes to best perform separate grating operations with the one grater. Also a series of the grating elements 12 and the slots 16 may be arranged along the grater in spaced sets or the grater may be of box-like form with separate grating elements in each side.

Preferably the valleys or spaces between the teeth 15 are cut off angularly at their bottoms down to meet the lower edge of the web 13 as indicated at 17 thus presenting the full face of the teeth to the food as it is moved across the teeth. These valleys or spaces may be rounded if desired or the teeth may be square with square spaces between as well as other shapes which may be found suitable.

In lieu of a separate toothed bar on each side of the grater a single section or member 12a may be used as shown in Figures 6 and 7, this member having spaced webs 13a forming a cleft 18 to receive the margins of the grater slot 16 and with a T-shaped head 19 with opposed webs 14a in which the teeth 15a are cut.

Other possible constructions and shapes for the toothed members or bars 12 will readily present themselves to those skilled in the art. Also if the material from which the grater 8 is formed is sufficiently heavy and of considerable hardness the teeth might be punched up from the grater. However, the use of a separate member allows the selection of a metal best suited to the making of strong durable teeth.

While I have herein set forth a certain preferred embodiment of my invention, it is understood that I may vary from the same in minor structural details, so as best to construct a practical device for the purpose intended, not departing from the spirit of the invention and within the scope of the appended claim.

I claim:

In a device of the kind described, a plate having a slot therein, a grating member detachably mounted on the longitudinal edge of the slot, said member comprising a narrow strip of metal having teeth at the opposite longitudinal edges thereof, spaced parallel webs extending longitudinally of the strip and integral with and perpendicular to one face thereof, the webs of said member contacting opposite sides of the plate.

ADOLF MACHOTKA.